United States Patent [19]

Takasaki

[11] Patent Number: 4,834,602
[45] Date of Patent: May 30, 1989

[54] TAPPING SCREW

[75] Inventor: Seiichiro Takasaki, Fujiidera, Japan

[73] Assignee: Yao Seibyo Co., Ltd., Osaka, Japan

[21] Appl. No.: 78,756

[22] Filed: Jul. 28, 1987

[30] Foreign Application Priority Data

Jun. 19, 1987 [JP] Japan .............................. 62-95054[U]

[51] Int. Cl.⁴ ............................................. F16B 25/00
[52] U.S. Cl. ..................................... 411/386; 411/413
[58] Field of Search ............... 411/386, 387, 413, 412, 411/399

[56] References Cited

U.S. PATENT DOCUMENTS

| | | | |
|---|---|---|---|
| 684,774 | 10/1901 | Baggs | 411/386 |
| 3,316,205 | 6/1964 | Angingh | 411/387 |
| 3,682,507 | 8/1972 | Wand | 411/413 |
| 3,942,405 | 3/1976 | Wagner | 411/386 |
| 4,241,638 | 12/1980 | Shimizu et al. | 411/386 |

FOREIGN PATENT DOCUMENTS 65519 3/1892 Fed. Rep. of Germany ....... 411/399

Primary Examiner—Neill R. Wilson
Attorney, Agent, or Firm—Wenderoth, Lind & Ponack

[57] ABSTRACT

A tapping screw having a tapered edge at a rear part of the tapered portion at its tip. The drill edge has the maximum diameter which is larger than the maximum thread diameter at the tapered portion and smaller than the maximum thread diameter at the shank. The drill edge allows the screw to be driven in more securely with a smaller driving force. The drill edge also has a greater lead angle than the lead angles of the threads on the tapered portion and on the shank rearwardly of the drill edge.

2 Claims, 1 Drawing Sheet

TAPPING SCREW

BACKGROUND AND FIELD OF THE INVENTION

The present invention relates to a tapping screw.

A conventional tapping screw has a thread with generally a uniform lead angle on the periphery of its shank over its entire length. In order to drive in the screw, it has to be turned while pressing very hard from the start. Further, it takes much time before the screw is driven in deep enough for it to stand on its own. Only a little relaxing of the driving force may cause the screw to skid, making it impossible to further drive in the screw.

In order to solve the abovesaid problems, the present applicant proposed a tapping screw (Japanese Unexamined Utility Model Publication No. 62-16992) in which the lead angle of its thread 10 increases toward the tip of the tapered portion 11, as shown in FIG. 4. With this prior art tapping screw, a thread 10' on the tip of the shank has such a lead as to be convergent to the axis of the screw so that the thread 10' will act as a drill edge, thus considerably improving the drilling capacity of the screw and permitting a positive driving.

With the conventional drill, the tip of its tapered end is adapted to be pressed against a clamp face to bite into it. If the clamp face is made of hard wood or the like, a great deal of force is needed for initial driving of the screw, and also much time is required for the screw to stand on its own. After a bore has been drilled by the tapered tip portion, the thread on the large-diameter shank bites into the bore with its leading end first, when a large torque is required to turn the screw and the thread is liable to slip and idle against the hard clamp face, inhibiting further driving of the screw.

SUMMARY OF THE INVENTION

An object of the present invention is to provide a tapping screw which obviates the abovesaid shortcomings and which can be driven easily even into a rather hard clamp face with a relatively small force.

In accordance with the present invention, there is provided a tapping screw having a shank and a tapered portion at tip thereof, the shank and the tapered portion having a thread on their outer periphery, characterised in that a drill edge is formed at a rear part of the tapered portion and that the maximum diameter at the drill edge is larger than the maximum thread diameter at the tapered portion and smaller than the maximum thread diameter at the shank.

The drill edge may be provided either separately from the thread at the other portions or continuously from them. What we refer to as a drill edge is a cutting edge which functions to chip off the threads tapped by the thread at the tapered portion while the tapping screw is turned.

With this invention, the drill edges are formed on the rear portion of the tapered end, so that the thread on the tapered end will firstly cut into the clamp face, and then chip off the tapped thread, and finally the thread in the rear of the drill edges will bite into the drilled hole which serves as a starting hole.

Since the screw bites spirally into the clamp face, lead by the thread on the tapered end, only a small driving force is sufficient even if the clamp face is made of a hard material. As the thread on the tapered end further bites into the clamp face, its pulling force acts on the screw, facilitating the biting-in of the drill edge and the thread on the rear of the shank inwardly. Thus, the screw can be securely threaded without slipping.

Moreover, since the drill edges ream a hole while the screw is being driven in, the penetration speed of the screw is considerably increased, and the next thread can be driven in with a small torque.

Other features and objects of the present invention will become apparent from the following description taken with reference to the accompanying drawings, in which:

DESCRIPTION OF THE PREFERRED EMBODIMENTS

Figure 1:
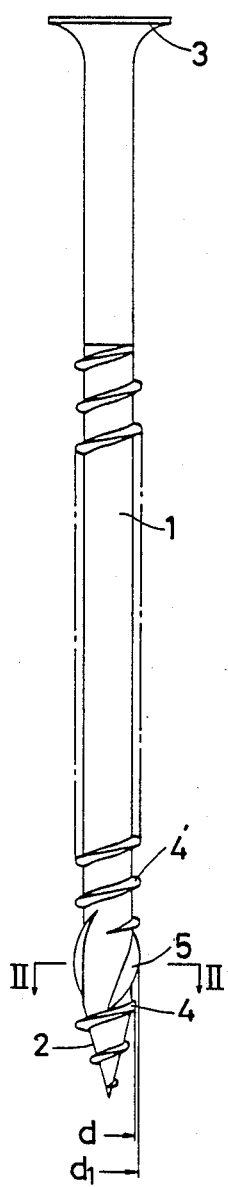
FIG. 1 is a front view of the tapping screw in accordance with the present invention.

Referring first to FIG. 1, a shank 1 has a conical tapered portion 2 at one end, and has at its other end a screw head 3 formed with a + or − shaped groove to receive a driver tip.

The shank 1 is provided on its periphery from the tip to the rear part of the shank with threads 4, 4' having a predetermined lead angle, interrupted with a threadless portion of a predetermined length disposed on the rear part of the tapered end 2. On the threadless portion are provided drill edges 5 independently of the threads 4, 4'.

Figure 2:
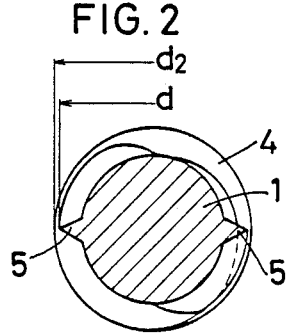
FIG. 2 is a sectional view taken along line II—II in FIG. 1.

The drill edges 5 have such a large lead as to be convergent to the axis of the shank 1, and have their top sharpened to form a ridge-like cutting edge, as shown in FIG. 2. As shown in FIGS. 1 and 2, the maximum diameter of the drill edges 5 is set to be larger than the maximum thread diameter $d_1$ at the tapered portion 2 and smaller than the maximum thread diameter $d_2$ at the shank. In operation, the threads 4 on the tapered portion 2 tap a thread, which is then chipped off with the drill edges 5. Into the hole thus made which serves as a starting hole, the threads 4' on the rear part of the shank are driven while tapping a thread in the wall of the hole.

The number of the threads 4 on the tapered portion should preferably be set at 2 to 4 in view of the balance between the ease of driving-in and the guiding effect after being driven in. The length of the drill edges 5 should preferably be substantially the same as that of the thread 4 on the tapered end.

Figure 3:
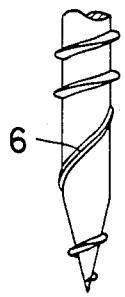
FIG. 3 is a partial front view of another embodiment.
Figure 4:
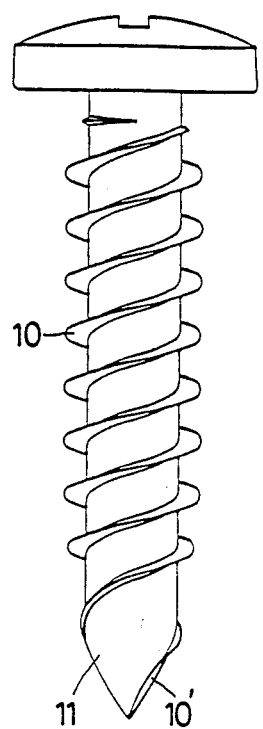
FIG. 4 is a front view of Applicant's prior art tapping screw.

As shown in FIG. 3, a thread 6 having a larger lead angle than the remaining threads 4, 4' for a predetermined length may be provided on the rear of the tapered end to serve as a drill edge. The tip of the thread 6 or helical edge as the drill edge should be sharpened in order to obtain a good cutting effect as a cutting edge.

The above-described tapping screw is adapted to bite into a clamp face, lead by the thread 4 on the tapered end 2, and then the drill edges 5 chip off the thread tapped by the thread 4 to ream the hole. Finally, the thread 4' on the main part of the shank bites into the drilled hole which serves as a starting hole. After biting into the clamp face, the thread 4 on the tapered end guides and pulls the screw as it further cuts into the clamp face, thus allowing the drill edges 5 and the thread 4' to bite securely, helping the screw to stand on its own quickly, and preventing the screw from reversing once it has been driven in, thus imparting excellent holding power to the screw. The drill edges 5 will help to increase the drilling speed and facilitate the tapping by the thread 4' on the main part of the shank. They also perform the function of sending the chips upward, taking advantage of their large lead and preventing the chips from getting stuck.

What I claim is:

1. A tapping screw for tapping and screwing into a substrate comprising:

a shank having a head end, a middle portion, and a tip end, and said tip end having a tapered portion;

first threads on the outer periphery of said tapered portion of said tip end for tapping a first thread in a substrate;

second threads on the outer periphery of said shank at said head end for tapping a second thread in a substrate, and separate from said first threads on said tapered portion; and at least one drill edge on the outer periphery of said middle portion of said shank for chipping off only a part of a first thread tapped in a substrate by said first threads and for sending the chipped off part of the first thread tapped in a substrate toward said head end of said tapping screw, said at least one drill edge being between said first and second threads, being separate from said first and second threads, said at least one drill edge extending helically around the longtiudinal axis of said shank, and having a lead angle larger than the lead angles of said first and second threads, and said at least one drill edge being an outwardly extending rib having an arcuate ridge line.

2. A tapping screw as in claim 1, wherein said at least one drill edge comprises two separate drill edges.

* * * * *